United States Patent
Heeke et al.

(10) Patent No.: US 8,201,674 B2
(45) Date of Patent: Jun. 19, 2012

(54) TORQUE CONVERTER WITH REVERSE

(75) Inventors: Gregory Heeke, Wooster, OH (US);
Adam Uhler, Sterling, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 905 days.

(21) Appl. No.: 12/283,320

(22) Filed: Sep. 11, 2008

(65) Prior Publication Data

US 2009/0071785 A1    Mar. 19, 2009

Related U.S. Application Data

(60) Provisional application No. 60/993,958, filed on Sep. 14, 2007.

(51) Int. Cl.
*F16D 33/02* (2006.01)
*F16D 25/10* (2006.01)
(52) U.S. Cl. ............. 192/3.22; 192/3.29; 192/48.5; 192/48.611; 60/333
(58) Field of Classification Search ............ 192/3.22; 60/331, 332, 333
See application file for complete search history.

(56) References Cited

U.S. PATENT DOCUMENTS

| | | | | |
|---|---|---|---|---|
| 3,073,181 A | * | 1/1963 | Kronogard | 60/333 |
| 3,189,144 A | * | 6/1965 | Gabriel | 192/3.29 |
| 4,869,128 A | * | 9/1989 | Ohkubo | 192/3.24 |
| 6,050,375 A | | 4/2000 | Gradu et al. | |
| 6,293,379 B1 | | 9/2001 | Gradu et al. | |
| 6,766,707 B2 | | 7/2004 | Schupp | |

* cited by examiner

*Primary Examiner* — Rodney Bonck
(74) *Attorney, Agent, or Firm* — Simpson & Simpson, PLLC

(57) ABSTRACT

A torque converter including: a turbine; a first stator; a first interlocking clutch; and a second interlocking clutch. In a first operating mode, to enable rotation of the turbine in a first direction, the first clutch is for engaging with the turbine and is engageable with an input shaft of a transmission and the second clutch is for engaging with the first stator and is engageable with a fixed shaft of the transmission. In a second operating mode, to enable rotation of the first stator in a second direction, opposite the first direction, the first clutch is for engaging with the first stator and is engageable with the input shaft and the second clutch is for engaging with the turbine and is engageable with the fixed shaft.

19 Claims, 2 Drawing Sheets

TORQUE CONVERTER WITH REVERSE

CROSS-REFERENCE TO RELATED APPLICATIONS

This application claims the benefit under 35 U.S.C. §119(e) of U.S. Provisional Application No. 60/993,958 filed Sep. 14, 2007, which application is incorporated herein by reference.

FIELD OF THE INVENTION

The invention relates generally to torque converters, and more specifically to a torque converter that is arranged to operate in both forward and reverse.

BACKGROUND OF THE INVENTION

Torque converters used with conventional automatic transmissions typically transmit torque in a single direction. Planetary gears in the transmission are easily configured to operate the vehicle in reverse. Unfortunately, CVT transmissions must incorporate an additional planetary gear to achieve reverse when used with a conventional torque converter, increasing the cost and complexity of the transmission.

Commonly owned U.S. Pat. No. 6,050,375 (granted Apr. 18, 2000 to Gradu et al. for "HYDROKINETIC TORQUE CONVERTER"), herein incorporated by reference, discloses a torque converter which achieves a reverse mode in a CVT transmission without the need for an additional planetary set. Gradu et al. disclose additional synchronizing mechanisms or units which are designed to conform the RPM of a driving part to the RPM of a driven part before such parts are positively (such a form-lockingly) connected to each other. Gradu et al. also disclose a thrust bearing between and rotatably coupling coaxial hubs to each other for joint movement in the axial direction of the torque converter. It would be desirable to eliminate the need for the additional synchronizing mechanisms and thrust bearings.

Thus there is a long-felt need for a torque converter design whereby additional synchronizing mechanisms and thrust bearings are not needed for operation in reverse.

BRIEF SUMMARY OF THE INVENTION

The present invention broadly comprises a torque converter including: a turbine; a first stator; a first interlocking clutch; and a second interlocking clutch. In a first operating mode, to enable rotation of the turbine in a first direction, the first clutch is for engaging with the turbine and is engageable with an input shaft of a transmission and the second clutch is for engaging with the first stator and is engageable with a fixed shaft of the transmission. In a second operating mode, to enable rotation of the first stator in a second direction, opposite the first direction, the first clutch is for engaging with the first stator and is engageable with the input shaft and the second clutch is for engaging with the turbine and is engageable with the fixed shaft.

In one embodiment, the torque converter includes a pump shell, a pump cover, and a friction clutch controllably connecting the pump shell and the pump cover. The pump clutch is for disengaging the pump shell and the pump cover prior to operating the first and second interlocking clutches. In another embodiment, to initiate the first operating mode, the first interlocking clutch is for displacing toward the second interlocking clutch in a first axial direction and the second interlocking clutch is for displacing toward the first interlocking clutch in a second axial direction, opposite the first axial direction. In a further embodiment, to initiate the second operating mode, the first interlocking clutch is for displacing away from the second interlocking clutch in a first axial direction and the second interlocking clutch is for displacing away from the first interlocking clutch in a second axial direction, opposite the first axial direction.

In one embodiment, the torque converter includes a second stator rotatable in the first operating mode and in the second operating mode, the first interlocking clutch is for engaging with the second stator and is engageable with the input shaft. In another embodiment, the first and second interlocking clutches are hydraulically sealed to one another. In a further embodiment, the torque converter includes a cover housing, a plate at least indirectly rotationally connectable to the input shaft and a lockup clutch and in the first operating mode, the lockup clutch is for engaging the cover housing and the plate. In yet another embodiment, the torque converter includes a one-way clutch located in a power flow path between the first stator and the second interlocking clutch.

The present invention also includes a torque converter with: a cover housing connectable to a motor; a pump cover connected to the drive cover; a pump shell; a turbine; a stator; a first torque path; and a second torque path, different than the first torque path. In a first operating mode, the first torque path includes the cover housing, the pump cover, the pump shell and the turbine and is connectable to an input shaft of a transmission and in a second operating mode, the second torque path includes the cover housing, the pump cover, the pump shell and the stator and is connectable to the input shaft.

The present invention further includes a method of operating a torque converter.

It is a general object of the present invention to provide a torque converter operable in a reverse mode and having reduced cost and space requirements.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural element of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
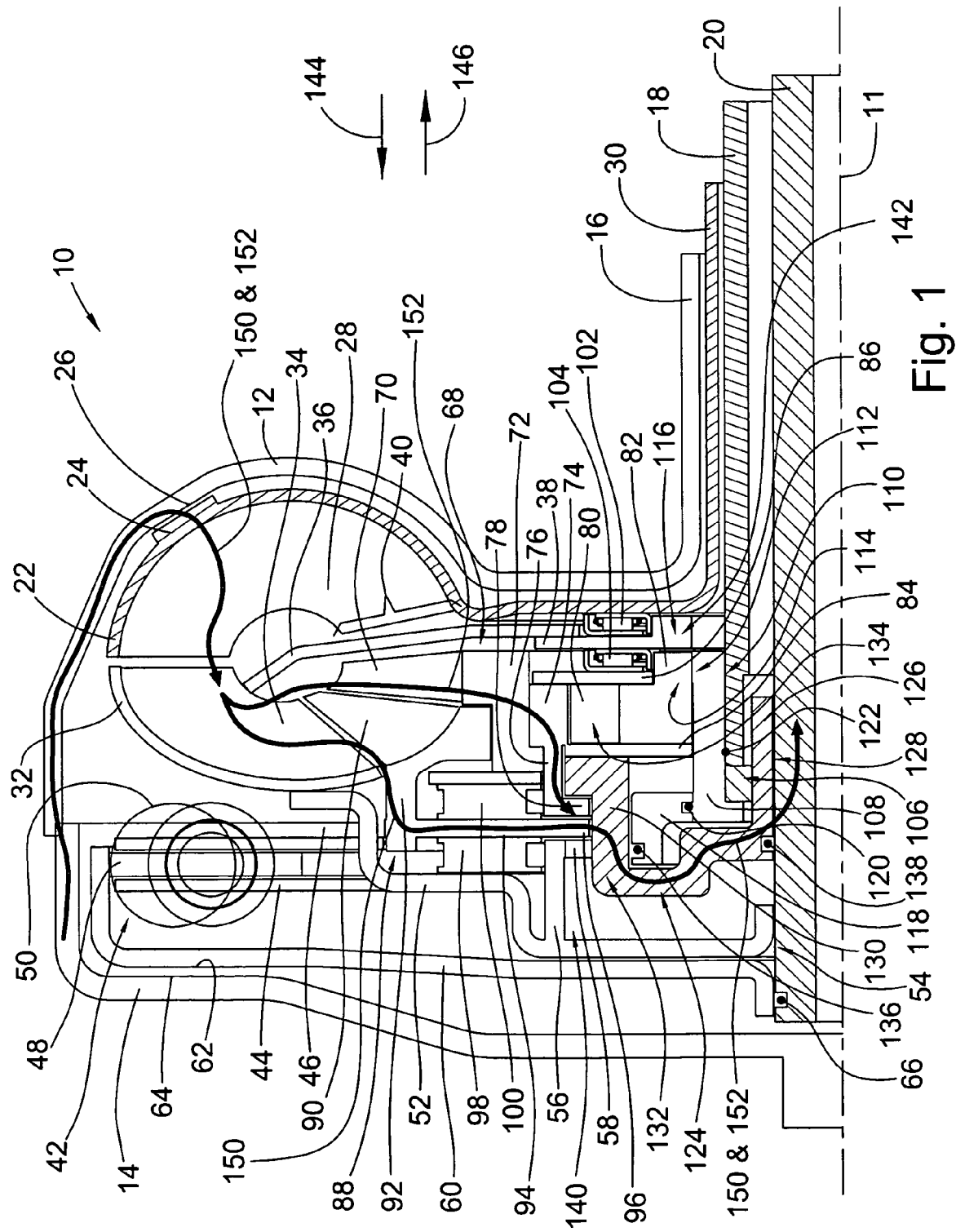
FIG. 1 is a top half cross sectional view of a present invention torque converter shown in a forward operating mode; and, FIG. 2 is the top half view of the torque converter shown in FIG. 1 depicting various hydraulic chambers of the torque converter.

FIG. 1 is a top half cross sectional view of present invention torque converter 10 shown in a forward operating mode. Torque converter 10 rotates about axis 11 and includes pump housing 12 and cover housing 14. Housings 12 and 14 are fixedly connected along an outer periphery by any means known in the art, for example by welding, to create a fluid-tight joint between the housings. Pump housing hub 16 extends axially into a transmission of a vehicle (not shown). The transmission includes fixed shaft 18 and input shaft 20.

Pump shell 22 includes friction clutch 24 for engagement with surface 26 of pump housing 12. Clutch 24 is operatively arranged between pump 22 and housing 12. Pump blades 28 are contained within shell 22. Pump shell hub 30 extends axially into the transmission.

Turbine shell 32 contains turbine blades 34. Connector 36 is attached to blades 34 and extends radially inward where it is fixedly attached to hub 38. Area 40 of connector 36 includes large flow passages (not shown) to minimize flow restriction during operation of converter 10.

Damper assembly 42 includes cover plates 44 and 46, flange 48, and spring 50. Plate 52 is fixedly attached to turbine shell 32 and drivingly engaged with cover plates 44 and 46. Plate 52 is centered on input shaft 20 at area 54. Plate 52 includes axial ring area 56 with lug portion 58. Piston plate 60 is drivingly engaged with flange 48 and clutch portion 62 is arranged to frictionally engage surface 64 of cover housing 14. Piston plate 60 is sealed to input shaft 20 by seal 66.

Stator 68 includes blade portion 70 and hub portion 72. Race 74 is drivingly engaged with hub portion 72 by a press-fit connection, for instance. Race 74 includes axial ring area 76 with lug portion 78. In one embodiment, race 74 is an outer race for a one-way clutch comprising rollers 80 and inner race 82. Side plates 84 and 86 axially retain rollers 80 and inner race 82.

Stator 88 includes blade portion 90 and hub portion 92. Hub portion 92 centers stator 88 on hub portion 72 of stator 68. Annular plate 94 is retained in stator 88 by a snap ring (not shown), for instance. Plate 94 includes lug portion 96. Thrust bearings 98 and 100 control axial position of stator 88 and provide a thrust path from stator 68 to plate 52. Thrust bearings 102 and 104 control axial position of hub 38 and provide a thrust path from pump shell 22 to side plate 86.

Piston 106 includes cylindrical portion 108 with spline area 110 drivingly engaged with fixed shaft 18. Portion 108 includes lug portion 112 arranged to engage lug portion 114 of race 82 in a first axial position and lug portion 116 of hub 38 in a second axial position. That is, piston 106 is axially moveable on spline 110 from a position in which lug 112 is drivingly engaged with lug 114 to a position in which lug 112 is drivingly engaged with lug 116. Optional ring 118 may be fixedly retained on piston 106 by snap rings, for example, and sealed to piston 106 by seal 120 to increase force exerted by piston 106 when pressure is applied as discussed infra. Piston 106 is sealed to fixed shaft 18 by seal 122.

Piston 124 includes cylindrical portion 126 with spline area 128 drivingly engaged with input shaft 20. Piston 124 includes ring section 130 with lug portions 132 and 134. In some aspects, lug 132 is axially shorter than lug 134. Lug portion 132 is arranged to engage lug 58 of plate 52 in a first axial position and lug 78 in a second axial position. In one embodiment, lug 132 also engages lug 96 in the second axial position. That is, piston 124 is axially moveable on spline 128 from a position in which lug 132 is drivingly engaged with lug 58 to a position in which lug 132 is drivingly engaged with lugs 74 and 96. Piston 124 is hydraulically sealed to piston 106 with seal 136 and hydraulically sealed to input shaft 20 with seal 138.

Interlocking clutch assembly 140 comprises lugs 58, 78, and 134. In one embodiment, assembly 140 further comprises lug 96. Interlocking clutch assembly 142 comprises lugs 112, 114, and 116. Clutches 140 and 142 are positively, not frictionally, engaged. In one embodiment, clutches 140 and 142 are "dog" clutches or "claw" clutches. Clutch 140 is arranged to engage turbine 32 with input shaft 20 and clutch 142 is arranged to engage stator 68 with fixed shaft 18 in a first operating mode of torque converter 10. Clutch 140 is arranged to engage stator 68 with input shaft 20 and clutch 142 is arranged to engage turbine 32 fixed shaft 18 in a second operating mode. In one embodiment, the one-way clutch is located in a power flow between stator 68 and interlocking clutch 142.

In the first operating mode, the turbine, connected to the input shaft, rotates in a forward direction and in the second operating mode, stator 68, connected to the input shaft, rotates in a reverse direction, opposite the forward direction. Thus, torque converter 10 rotates input shaft 20 in the forward direction in the first operating mode and in the second reverse direction in the second operating mode. Friction clutch 24 is disengaged before torque converter 10 is switched from the first operating mode to the second operating mode. Disengagement of friction clutch 24 removes torque from clutches 140 and 142 to enable the clutches to engage smoothly without the use of synchronizers. First clutch 140 moves in direction of arrow 144 and second clutch 142 moves in direction of arrow 146, axially opposite direction 144, when torque converter 10 switched from the first operating mode to the second operating mode.

When torque converter 10 includes optional stator 88, stator 88 is free to rotate in the first operating mode, and interlocking clutch 140 is further arranged to engage stator 88 with input shaft 20 in the second operating mode. When torque converter 10 includes optional lockup clutch 62, interlocking clutch 140 is further arranged to engage lockup clutch 62 with input shaft 20 in the first operating mode.

Alternately stated, torque converter 10 includes controllable torque path 150 including the cover housing, the pump cover, the pump shell and the turbine. By controllable we mean that the path can be opened (torque cannot transmit from the cover housing to the input shaft) or closed (torque can transmit from the cover housing to the input shaft). Path 150 is connectable to input shaft 20, for example, via the operation of clutch 140. Torque converter 10 also includes controllable torque path 152 including the cover housing, the pump cover, the pump shell and stator 68. Path 152 is connectable to input shaft 20, for example, via the operation of clutch 142.

The present invention also comprises a method of operating a torque converter. Although the method is presented as a sequence for clarity, no order should be inferred from the sequence unless explicitly stated. A first step disengages a pump clutch and, for a first operating mode, a second step engages a first interlocking clutch to drivingly connect a turbine in said converter with an input shaft for a transmission; a third step engages a second interlocking clutch to drivingly connect a first stator in said converter with a fixed shaft for the transmission; and a third step engages the pump clutch. In one embodiment, to switch to a second operating mode; a fourth step disengages the pump clutch; a fifth step engages the first interlocking clutch to drivingly connect the first stator with the input shaft; a sixth step engages the second interlocking clutch to drivingly connect the turbine with the fixed shaft; and a seventh step engages the pump clutch.

In another embodiment, for the first mode, engaging the first clutch includes moving the first clutch in a first axial direction toward the second clutch and engaging the second clutch includes moving the second clutch toward the first clutch in a second axial direction opposite the first direction. In a further embodiment, to switch to a second operating mode includes moving the first clutch in a first axial direction away from the second clutch and moving the second clutch away from the first clutch in a second axial direction opposite the first direction. In yet another embodiment, for the second mode, an eighth step engages a third interlocking clutch to drivingly connect a second stator in the converter with the input shaft. In a still further embodiment, engaging the third clutch includes moving the clutch in an axial direction.

Figure 2:
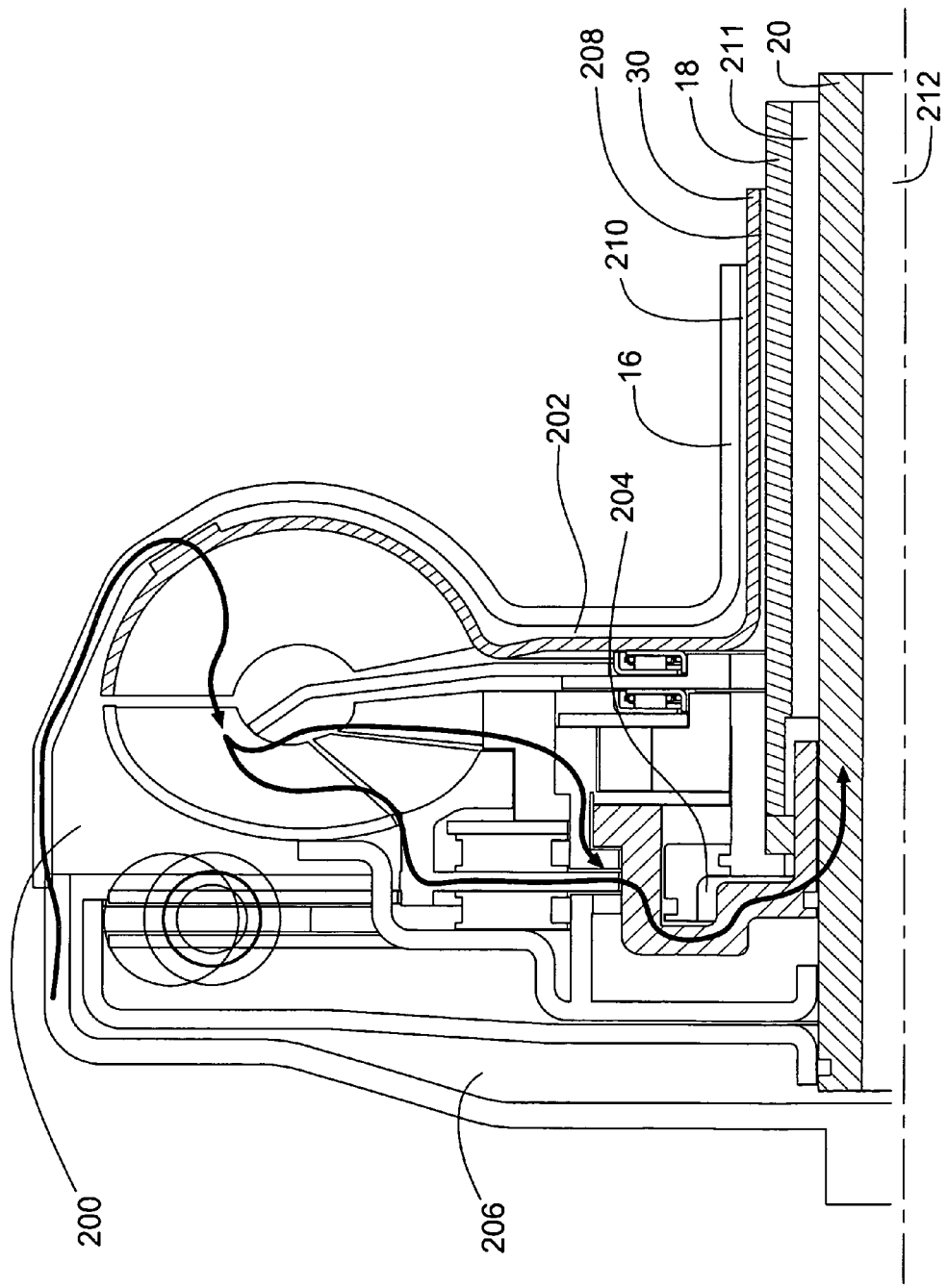

FIG. 2 is the top half view of torque converter 10 shown in FIG. 1 depicting various hydraulic chambers of the torque converter. The following should be viewed in light of FIGS. 1 and 2. Torque converter 10 includes chamber 200 partially formed by housings 12 and 14, chamber 202 partially formed by housing 12 and shell 22, chamber 204 partially formed by pistons 106 and 124, and chamber 206 partially formed by housing 14 and piston 60. Hydraulic pressure is supplied to torque converter 10 from a transmission (not shown). Hydraulic pressure is supplied to chamber 200 through cylindrical area 208 located between fixed shaft 18 and pump shell hub 30. Hydraulic pressure is supplied to chamber 202 through cylindrical area 210 located between pump housing hub 16 and pump shell hub 30. Pressure is supplied to chamber 204 through cylindrical area 211 located between fixed shaft 18 and input shaft 20. Pressure is supplied to chamber 206 through hollow center 212 of input shaft 20.

To operate torque converter 10 in forward mode, pressure in chamber 200 is made higher than pressure in chambers 202 and 204. Lower pressure in chamber 202 causes the pump shell to axially displace so that pump clutch 24 engages and pistons 106 and 124 to move axially towards each other to initiate the first operating mode as described supra. Pressure in chamber 206 is higher than pressure in chamber 200 to release clutch 62 and enable cooling flow through converter 10. At a predetermined operating condition, pressure in chamber 206 can be lowered or pressure in chamber 200 can be raised to engage clutch 62 and improve efficiency of converter 10.

To switch to reverse mode, pressure in chamber 202 is raised to exceed pressure in chamber 200 and disengage pump clutch 24. Alternatively, pressure in chamber 200 could be lowered. Advantageously, disengagement of pump clutch 24 reduces torque transmitted by clutches 140 and 142, allowing disengagement and engagement of the clutches without the use of synchronizers. Once pump clutch 24 is disengaged, pressure in chamber 204 is raised to exceed pressure in chamber 200 causing pistons 106 and 124 to move axially away from each other to initiate the second operating mode as described supra. Pressure in chamber 202 can then be lowered to engage clutch 24 to transmit torque.

The present invention also includes a method of operating a torque. Although the method is presented as a sequence for clarity, no order should be inferred from the sequence unless explicitly stated. A first step supplies a first hydraulic pressure to a first chamber in said torque converter; a second step supplies a second hydraulic pressure to a second chamber to disengage a pump clutch, the second hydraulic pressure greater than the first hydraulic pressure; a third step supplies, for a first operating mode, a third hydraulic pressure to a third chamber to operate first and second interlocking clutches, the third hydraulic pressure less than the first hydraulic pressure; and a fourth step decreases the second hydraulic pressure to engage the pump clutch. In one embodiment, a fifth step increases the second hydraulic pressure to disengage the pump clutch; a sixth step increases, to switch to a second operating mode, the third hydraulic pressure, to operate the first and second interlocking clutches; and seventh step decreases the second hydraulic pressure to engage the pump clutch. In another embodiment, an eighth step supplies a fourth hydraulic pressure to a fourth chamber to close a lock-up clutch, the fourth hydraulic pressure less than the first hydraulic pressure. In a further embodiment, the third chamber is at least partially formed by a first piston and a second piston.

In one embodiment, supplying, for a first operating mode, a third hydraulic pressure to a third chamber to operate first and second interlocking clutches, the third hydraulic pressure less than the first hydraulic pressure includes moving the first piston in a first axial direction toward the second piston and moving the second piston toward the first piston in a second axial direction opposite the first direction. In another embodiment, increasing, to switch to a second operating mode, the third hydraulic pressure, to operate first and second interlocking clutches, so that the third hydraulic pressure is greater than the first hydraulic pressure includes moving the first piston in a first axial direction away from the second piston and moving the second piston away from the first piston in a second axial direction opposite the first direction.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What we claim is:

1. A torque converter comprising:
   a cover housing connectable to a motor;
   a pump cover connected to the cover housing;
   a pump shell;
   a pump clutch arranged to connect the pump cover with the pump shell and to disconnect the pump cover from the pump shell;
   a turbine;
   a first stator;
   a first interlocking clutch; and,
   a second interlocking clutch, wherein in a first operating mode, to enable rotation of the turbine in a first direction, the pump clutch is for connecting the pump cover to the pump shell, the first clutch is for engaging with the turbine and is engageable with an input shaft of a transmission and the second clutch is for engaging with the first stator and is engageable with a fixed shaft of the transmission, wherein in a second operating mode, to enable rotation of the first stator in a second direction, opposite the first direction, the pump clutch is for connecting the pump cover to the pump shell, the first clutch is for engaging with the first stator and is engageable with the input shaft and the second clutch is for engaging with the turbine and is engageable with the fixed shaft, and wherein the pump clutch is for disconnecting the pump cover from the pump shell during a transition from the first operating mode to the second operating mode.

2. The torque converter of claim 1 the pump clutch for disengaging the pump shell and the pump cover prior to operating the first and second interlocking clutches.

3. The torque converter of claim 1 wherein, to initiate the first operating mode, the first interlocking clutch is for displacing toward the second interlocking clutch in a first axial direction and the second interlocking clutch is for displacing toward the first interlocking clutch in a second axial direction, opposite the first axial direction.

4. The torque converter of claim 1 wherein, to initiate the second operating mode, the first interlocking clutch is for displacing away from the second interlocking clutch in a first axial direction and the second interlocking clutch is for displacing away from the first interlocking clutch in a second axial direction, opposite the first axial direction.

5. The torque converter of claim 1 further comprising a second stator rotatable in the first operating mode and wherein, in the second operating mode, the first interlocking clutch is for engaging with the second stator and is engageable with the input shaft.

6. The torque converter of claim 1 wherein the first and second interlocking clutches are hydraulically sealed to one another.

7. The torque converter of claim 1 further comprising a plate at least indirectly rotationally connectable to the input shaft and a lockup clutch and wherein, in the first operating mode, the lockup clutch is for engaging the cover housing and the plate.

8. The torque converter of claim 1 further comprising a one-way clutch located in a power flow path between the first stator and the second interlocking clutch.

9. A torque converter comprising:
a cover housing connectable to a motor;
a pump cover connected to the cover housing;
a pump shell;
a first interlocking clutch including a first element displaceable in a first axial direction to operate the first interlocking clutch in a first operating mode;
a second interlocking clutch including a second element displaceable in a second axial direction, opposite the first axial direction, to operate the second interlocking clutch in the first operating mode:
a turbine;
a stator;
a first torque path; and,
a second torque path, different than the first torque path, wherein in the first operating mode, the first torque path includes the cover housing, the pump cover, the pump shell, the first interlocking clutch, and the turbine and is connectable to an input shaft of a transmission and wherein in the second operating mode, the second torque path includes the cover housing, the pump cover, the pump shell, the second interlocking clutch, and the stator and is connectable to the input shaft.

10. A method of operating a torque converter, including the steps of:
disengaging a pump clutch; and,
for a first operating mode:
engaging a first interlocking clutch to drivingly connect a turbine in said converter with an input shaft for a transmission;
engaging a second interlocking clutch to drivingly connect a first stator in said converter with a fixed shaft for the transmission; and,
engaging the pump clutch, wherein:
engaging the first interlocking clutch includes displacing the first interlocking clutch in a first axial direction; and,
engaging the second interlocking clutch includes displacing the second interlocking clutch in a second axial direction, opposite the first axial direction.

11. The method of claim 10, including the steps of:
to switch to a second operating mode:
disengaging the pump clutch;
engaging the first interlocking clutch to drivingly connect the first stator with the input shaft;
engaging the second interlocking clutch to drivingly connect the turbine with the fixed shaft; and,
engaging the pump clutch.

12. The method of claim 11, wherein to switch to a second operating mode includes moving the first clutch in a first axial direction away from the second clutch and moving the second clutch away from the first clutch in a second axial direction opposite the first direction.

13. The method of claim 11, further including the step of engaging, a third interlocking clutch to drivingly connect a second stator in the converter with the input shaft.

14. The method of claim 13, wherein engaging the third clutch includes moving the clutch in an axial direction.

15. A method of operating a torque converter comprising the steps of:
supplying a first hydraulic pressure to a first chamber in said torque converter;
supplying a second hydraulic pressure to a second chamber to disengage a pump clutch, the second hydraulic pressure greater than the first hydraulic pressure;
supplying, for a first operating mode, a third hydraulic pressure to a third chamber to operate first and second interlocking clutches by displacing a piston for the first interlocking clutch in a first axial direction and displacing a piston for the second interlocking clutch in a second axial direction, opposite the first axial direction, the third hydraulic pressure less than the first hydraulic pressure; and,
decreasing the second hydraulic pressure to engage the pump clutch.

16. The method of claim 15, further comprising the steps of:
increasing the second hydraulic pressure to disengage the pump clutch;
increasing, to switch to a second operating mode, the third hydraulic pressure, to operate the first and second interlocking clutches; and,
decreasing the second hydraulic pressure to engage the pump clutch.

17. The method of claim 16, further comprising the step of supplying a fourth hydraulic pressure to a fourth chamber to close a lock-up clutch, the fourth hydraulic pressure less than the first hydraulic pressure.

18. The method of claim 15 wherein said third chamber is at least partially formed by a first piston and a second piston.

19. The method of claim 15 wherein supplying, for a first operating mode, a third hydraulic pressure to a third chamber to operate first and second interlocking clutches, the third hydraulic pressure less than the first hydraulic pressure includes moving the first piston in a first axial direction toward the second piston and moving the second piston toward the first piston in a second axial direction opposite the first direction.

* * * * *